United States Patent [19]
Ghosh

[11] Patent Number: 6,058,150
[45] Date of Patent: May 2, 2000

[54] METHOD AND APPARATUS FOR COMBINED TIMING RECOVERY, FRAME SYNCHRONIZATION AND FREQUENCY OFFSET CORRECTION IN A RECEIVER

[75] Inventor: Biswa R. Ghosh, Mountain View, Calif.

[73] Assignee: Wireless Access, Inc., Santa Clara, Calif.

[21] Appl. No.: 08/941,598

[22] Filed: Sep. 30, 1997

[51] Int. Cl.⁷ .................................................. H04L 7/00
[52] U.S. Cl. .................... 375/365; 375/344; 375/355; 375/371; 370/514
[58] Field of Search ................... 375/365, 371, 375/344, 355, 334, 354, 362; 370/514

[56] References Cited

U.S. PATENT DOCUMENTS

| | | | |
|---|---|---|---|
| 4,599,732 | 7/1986 | LeFever | 375/346 |
| 5,347,548 | 9/1994 | Messerges et al. | 375/371 |
| 5,400,368 | 3/1995 | Cheng et al. | 375/354 |
| 5,436,942 | 7/1995 | Cheng et al. | 375/229 |
| 5,491,726 | 2/1996 | Cheng et al. | 375/343 |
| 5,610,939 | 3/1997 | Takahashi et al. | 375/206 |
| 5,625,652 | 4/1997 | Petranovich | 375/355 |
| 5,633,898 | 5/1997 | Kishigami et al. | |
| 5,818,882 | 10/1998 | Komatsu | 375/344 |

*Primary Examiner*—Stephen Chin
*Assistant Examiner*—Lenny Jiang
*Attorney, Agent, or Firm*—Blakely, Sokoloff, Taylor & Zafman LLP

[57] ABSTRACT

A method and apparatus for combined timing recovery, frame synchronization and frequency offset correction in a digital receiver is provided. In general, the present invention provides a pair of correlators that operate on a set of samples output by a discriminator. A positive correlator generates a positive correlation value and a negative correlator generates a negative correlation value. The positive and negative correlation values are used to determine frame synchronization, frequency offset and timing recovery values so that timing recovery, frame synchronization and frequency offset correction may be performed simultaneously.

23 Claims, 3 Drawing Sheets

METHOD AND APPARATUS FOR COMBINED TIMING RECOVERY, FRAME SYNCHRONIZATION AND FREQUENCY OFFSET CORRECTION IN A RECEIVER

FIELD OF THE INVENTION

The present invention relates to signal processing, and more specifically, to receiving and recovering information in a wireless communication system.

BACKGROUND OF THE INVENTION

In a wireless communication system, such as one-way and two-way paging, that carries information, a receiver must perform certain tasks in order to recover the information. These tasks include timing recovery, frame synchronization and frequency offset correction. These tasks are typically implemented as three separate procedures that occur in sequence.

In prior art wireless communication systems using frequency shift keying (FSK) modulation, the receiver radio frequency (RF) front end typically has an analog discriminator output as the final output stage. This output is digitized and processed in a digital signal processor, microprocessor, or application-specific integrated circuit (ASIC). The amplitude of the discriminator output is proportional to the frequency deviation of the transmitted signal. The discriminator output must be mapped to bit values, or sliced, at the proper time as determined by the timing recovery. The bit values are used to determine correct frame synchronization. In addition, any frequency offset in the signal received causes the discriminator output to be shifted. This frequency offset must be removed prior to slicing.

If the tasks of timing recovery, frame synchronization and frequency offset correction are performed in sequence, either timing recovery or frequency offset correction is performed first and frame synchronization is completed last. If timing recovery is performed first, the timing recovery method must be tolerant of frequency offsets. Similarly, if frequency offset correction is performed first, the method used must be independent of symbol timing. In either case the time necessary to complete all of these three operations is due to each being performed sequentially with respect to the others. There is a desire to speed up the recovery of information in wireless systems. Therefore, what is needed is a way to speed up the timing recovery, frame synchronization and frequency offset correction in a wireless receiver.

The present invention provides for performing the three tasks of timing recovery, frame synchronization and frequency offset correction simultaneously.

SUMMARY OF THE INVENTION

A method of processing an input data stream in a receiver is disclosed. The receiver performs timing recovery on a portion of the input data stream being received. The receiver also performs frame synchronization and frequency correction on the portion of the input data stream simultaneously with performing frame synchronization.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for combined timing recovery, frame synchronization and frequency offset correction in a digital receiver is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

Overview of the Receiver

In general, the present invention provides a receiver for use in a wireless system having a radio frequency (RF) front end that generates an output from a discriminator. A buffer is provided to receive the outputs of the discriminator. An integrator operates on sets of data received from the buffer. A pair of correlators operate on the output of the integrator.

The positive correlator generates a positive correlation value and the negative correlator generates a negative correlation value. The positive and negative correlation values are used to determine frame synchronization, frequency offset and timing recovery values. In the present invention, timing recovery, frame synchronization and frequency offset correction may be accomplished in a simultaneously.

By performing the tasks simultaneously, complete synchronization can be achieved much faster than would be otherwise possible. This is particularly advantageous in a wireless environment where loss of synchronization due to interference is common and fast resynchronization is desirable, such as one-way and two-way paging systems.

In the following description, specific parameter values will be used; however, the method and apparatus described are applicable to more general cases. Specifically, it will be assumed that the transmitted signal has a frame structure that consists of a synchronization field followed by a data field and that the synchronization field is included in every frame.

The synchronization field contains 32 symbols of alternating maximum deviations at 1600 Hz. The receiver has a discriminator, the output of which is sampled at a rate of 12.8 kHz, or eight samples per 1600 Hz (T/8 sampling). Of course, other lengths of synchronization field and other sample rates may also be used. Furthermore, the data which follows the synchronization field may be transmitted at a higher rate, such as 3200 Hz.

Furthermore, the present invention is described in a wireless system that communicates information using frequency shift keying (FSK) modulation. However, timing recovery and frame synchronization as described herein is not limited to use in an FSK system.

Message Protocol

Figure 1:
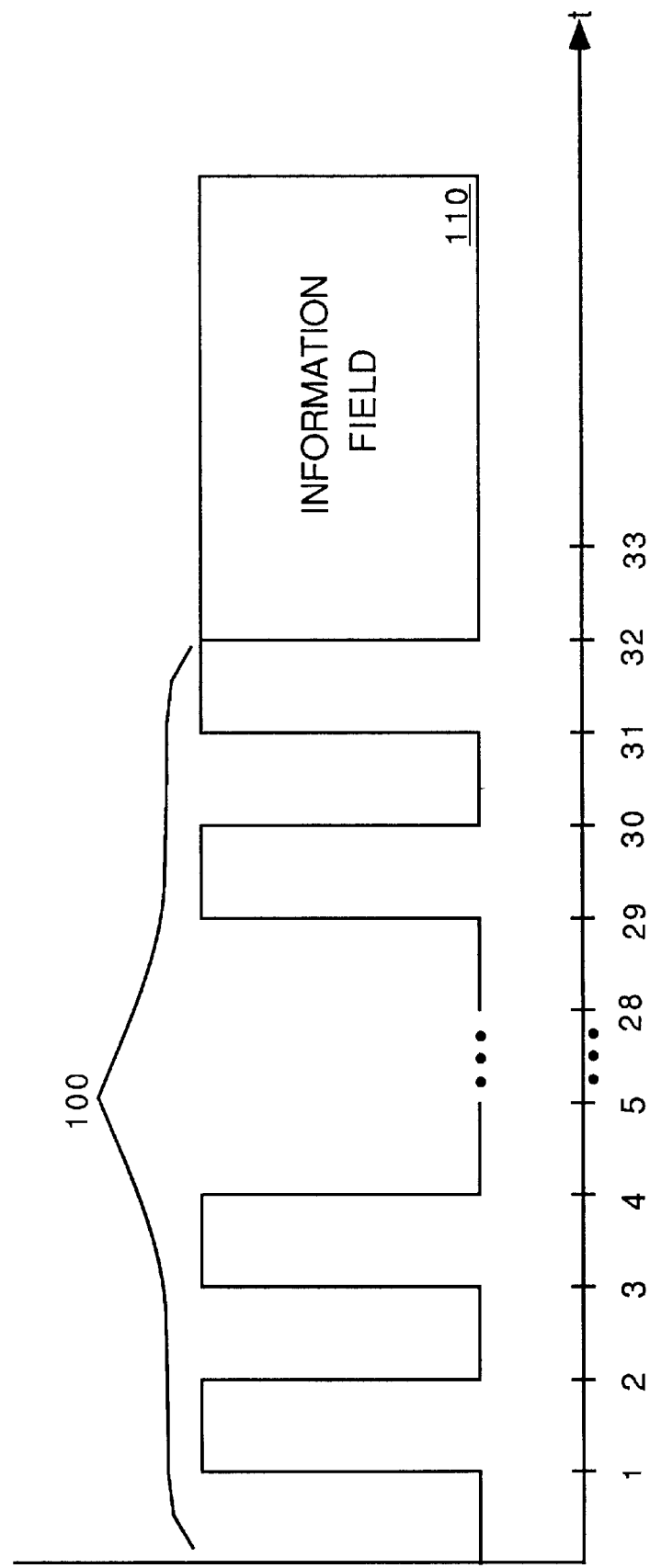
FIG. 1 is a timing diagram of a packet containing digital information according to one embodiment of the present invention.

FIG. 1 is a timing diagram of a packet according to one embodiment of the present invention. For purposes of explanation, a symbol is the duration of a signal. The alternating maximum deviations of the synchronization field (Bit Sync) 100 are transmitted for the first 32 time periods of the packet. The remaining signals in the packet comprise the information field 110. According to one embodiment, the information field is transmitted via four level FSK. Thus, the signals of the packet correspond to one of four amplitudes. Alternatively, other transmission methods may be used.

Figure 2:
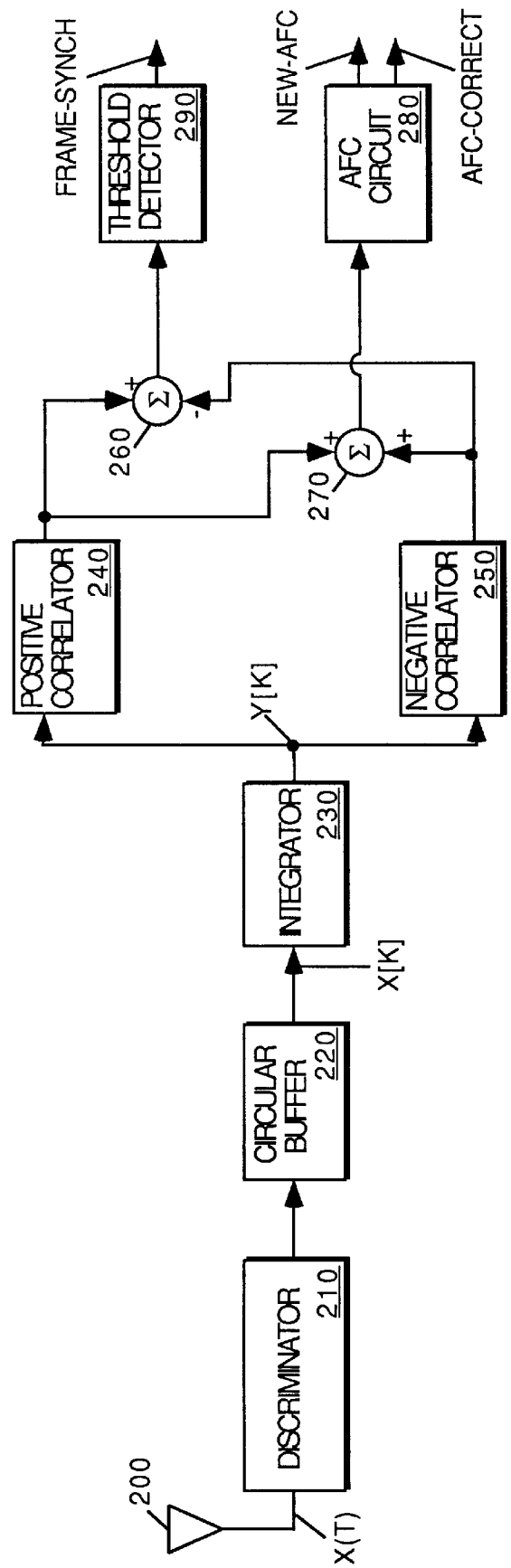
FIG. 2 is a block diagram of one embodiment of a digital receiver according to the present invention.

Receiver Providing Simultaneous Frame Synchronization, Timing Recovery and Frequency Offset Correction FIG. 2 is a block diagram of one embodiment of a receiver according to the present invention. The receiver includes antenna 200 that receives signals, x(t), transmitted by a transmitter (not shown). According to one embodiment, the transmitter is part of a paging network; however the transmitter may be part of any wireless communications network. For example, the transmitter may be part of a wireless computer network or a cellular telephone network.

Antenna 200 is connected to discriminator 210. Discriminator 210 demodulates the signal received by antenna 200. Discriminator 210 may be either an analog discriminator or a digital discriminator. Circular buffer 220 is coupled to the output of discriminator 210 and stores sampled values of the output of discriminator 210. Thus, the output of circular buffer 220, x[k], is a digitized version of the analog signal received by antenna 200, x(t).

Integrator 230 integrates the output of circular buffer 220. In one embodiment, integrator 230 is not a true integrator, rather it is an eight-sample sliding integrator that computes the average of the last eight samples from the discriminator:

$$y[k] = \frac{1}{8}\sum_{l=0}^{7} x[k - l].$$  Equation 1

An eight-sample sliding scale integrator provides decreased performance compared to a true integrator; however, the hardware and computation advantages compensate for decreased accuracy. According to one embodiment, integrator 230 subtracts the value of the oldest sample from its output and adds the value of a new sample rather than summing eight samples for each mean. The output of integrator 230 is y[k].

The output of integrator 230 is coupled to positive correlator 240 and to negative correlator 250. The positive and negative correlators 240 and 250 detect the positive and negative peaks, respectively, of y[k]. When the synchronization field is being received, 16 successive positive peaks alternating with 16 successive negative peaks are received. Correlators 240 and 250 produce maximum output when the output of integrator 230 corresponds to the frame synchronization field and lower for any other output of integrator 230.

The output of positive correlator 240 is:

$$p\_corr[k] = \frac{1}{16}\sum_{i=0}^{15} y[k - 16i - 8].$$  Equation 2

The output of negative correlator 250 is:

$$n\_corr[k] = \frac{1}{16}\sum_{i=0}^{15} y[k - 16i].$$  Equation 3

In Equations 1 and 2, i and k are indices over T/8-spaced samples. The two correlations are performed separately for use in the frequency offset correction procedure.

The outputs of positive correlator 240 and negative correlator 250 are coupled to summer 260 and summer 270. Summer 260 subtracts the output of negative correlator 250 from the output of positive correlator 240. Summer 270 adds the output of positive correlator 240 to the output of negative correlator 250.

An overall correlation value is calculated based on the outputs of positive correlator 240 and negative correlator 250 by summer 260:

$$\text{corr}[k] = p\_\text{corr}[k] - n\_\text{corr}[k].$$  Equation 4

When the correlation value surpasses a predetermined threshold correlation value, the receiver is considered synchronized. Summer 270 also calculates an output based on the outputs of positive correlator 240 and negative correlator 250. However, the output of summer 270 is the sum of the correlation values.

The outputs of summer 260 and summer 270, are coupled to threshold detector 290 and automatic frequency correction (AFC) circuit 280, respectively. Threshold detector 290 determines whether the correlation value generated by summer 260 exceeds a predetermined threshold value. If so, the frame synchronization has been achieved and the frame__ synch output is asserted. AFC circuit 280 generates outputs afc__new and afc__correct that are used for frequency correction, discussed below.

The threshold correlation value is lower than the maximum correlation value because the maximum correlation is typically not achieved under poor signal conditions. According to one embodiment, the threshold correlation value is determined empirically by simulations under fading conditions, so that synchronization is detected under poor signal conditions, while the probability of false synchronization is kept acceptably low.

According to one embodiment, the correlation values are adjusted to accommodate the scaling in Eqs. 1–3. In this embodiment, scaling by ⅛ in Eq. 1 and by 1/16 in Eqs. 2 and 3 is not done. Rather the correlation values are adjusted according to these scaling factors to simplify the calculations required to achieve frame synchronization, timing recovery and offset correction. Thus, division is not performed for each evaluation of Eqs. 1–3, which simplifies the circuitry required to implement the present invention.

Once synchronized, subsequent correlation values are processed until a maximum correlation is found. The maximum correlation is used to find the optimum sampling point. This is timing recovery. This sampling point determines the best timing phase, which has a fixed offset from the best slicing phase. According to one embodiment, a three-sample offset is used, which results in a delay of three samples.

Any carrier frequency offset results in a non-zero shift of discriminator 210 output. To the extent that discriminator 210 is kept in its linear range of operation, the shift is proportional to the amount of offset. According to one embodiment, the range of operation used is primarily within the linear area, such that this is a valid assumption.

The shift of discriminator 210 output can be measured from the positive and negative correlations when synchronization is detected. Because the synchronization pattern has an equal number of positive and negative maximum deviations, the average value of the output of discriminator 210 over this pattern should be zero, and any non-zero value is proportional to the frequency offset. Thus, when synchronization is detected, the offset estimate is calculated as:

$$afc\_new = \frac{1}{2}(p\_corr[k] + n\_corr[k]).\qquad\text{Equation 5}$$

This estimate is used to update a first order update equation:

$$afc\_correct[n+1]=(1-\alpha)afc\_correct[n]+\alpha(afc\_new)\qquad\text{Equation 6}$$

where $|\alpha|<1$ for stability. According to one embodiment, $\alpha=0.125$. The index n refers to the frame index. According to one embodiment, afc_correct is the only parameter value carried over from one frame to the next. Alternatively, other types of update equations may also be used, such as second order update equations. Thus, frequency offset correction is performed simultaneously with timing recovery and frame synchronization.

The value of afc_correct may be used in several ways. For example, it may be used to rotate each incoming sample digitally or it may be fed back to the RF section for analog correction. It may also be used to shift the decision thresholds for slicing.

From the foregoing discussion it can be seen that timing recovery, frame synchronization and frequency offset correction can be accomplished with only addition computations, which eliminates the need to perform multiplication computations that are typically used. Because multiplication is more complex and time consuming than addition, this translates into power and circuitry savings.

In summary, signals received by antenna 200 are processed by discriminator 210 and stored in circular buffer 220. Integrator 230 processes values retrieved from circular buffer 220. The output of integrator 230 is used by positive correlator 240 and negative correlator 250 to allow simultaneous timing recovery, frame synchronization and frequency offset correction.

The outputs of positive correlator 240 and negative correlator 250 are subtracted by summer 260. Because the output of negative correlator 250, which is negative is subtracted from the output of positive correlator 240, which is positive, the output of summer 260 reaches its maximum value when the Bit Sync pattern is received. At this time frame synchronization is achieved. Timing recovery is also achieved because sampling may be performed at some fixed offset from the time frame synchronization is achieved. Frequency offset correction is achieved at this time also because the output of summer 270 gives the dc offset of the Bit Sync pattern, which corresponds to the required frequency correction.

Overview of the Paging System of the Present Invention

The present invention may be implemented for use with pagers in a one-way or two-way paging system. In other words, the receiver of the present invention may be designed for use in a one-way paging system or a two-way paging system. In a one-way paging system, a computer, server, or other control device is interfaced to a transmitter in the paging system and initiates transmission of paging messages. The transmitter, via links to a satellite and one or more base transceivers, sends these paging messages to pagers.

Figure 3:
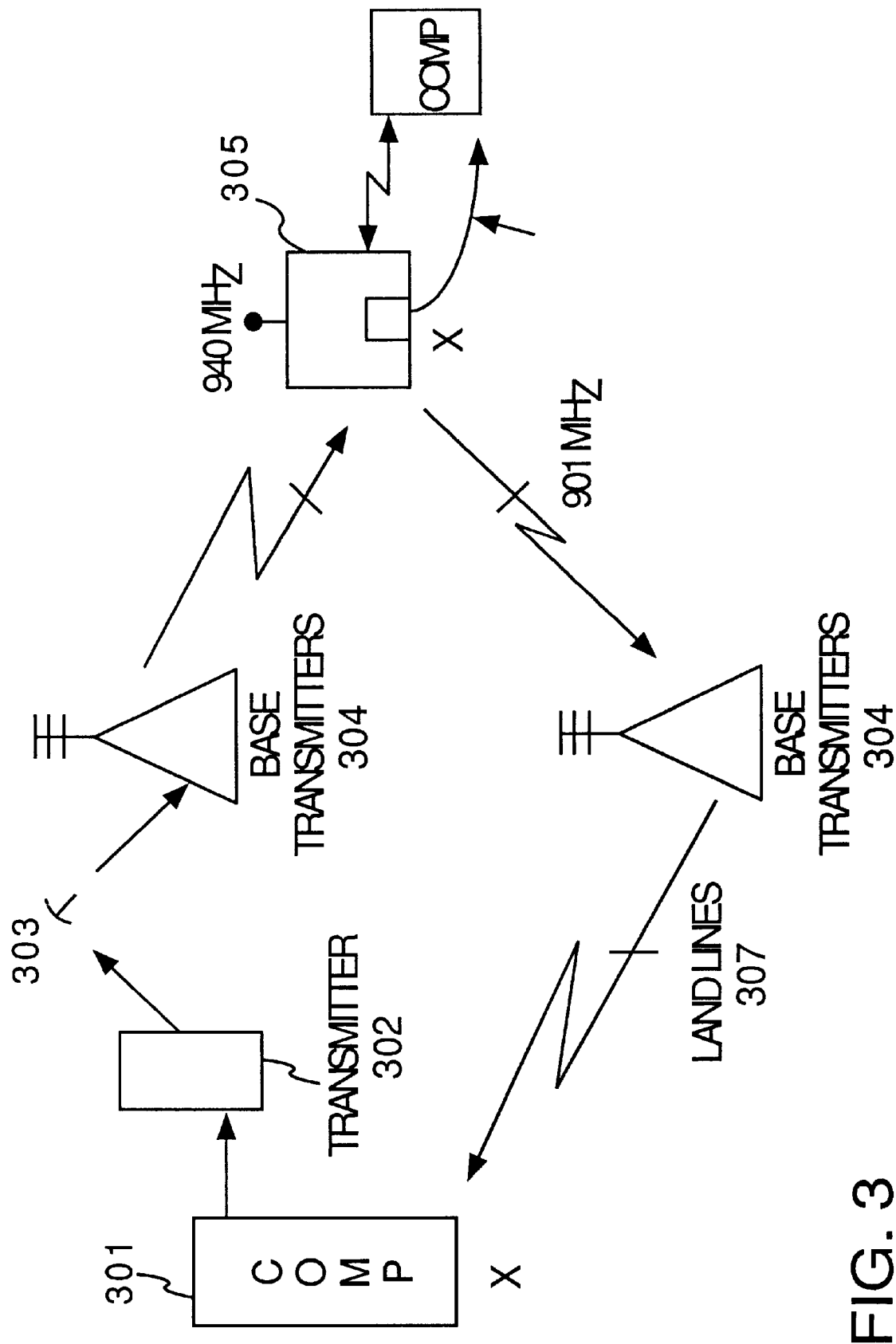
FIG. 3 is an exemplary paging system that may employ a receiver according to the present invention.

In a two-way paging system, such as is shown in FIG. 3, these same components comprise the same communication path to the pager. Referring to FIG. 3, a computer or other control device 301 interfaces with a paging transmitter 302 (via, for instance, the Internet or some other network), transmitter 302 sends paging messages using satellite 303, and in turn satellite 303 transmits the paging messages to base transmitter 304 for forwarding onto pager 305. In one embodiment, the communication between base transmitter 304 and pager 305 occurs at 940 MHz. Pager 305 includes transmitter functionality that allows for transmitting messages over air waves at 901 MHz to base receiver 306. Such functionality is well-known in the art. Base receiver 306 uses land lines to transmit the messages to control device 301.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Thus, a method and apparatus for combined timing recovery, frame synchronization and frequency offset correction in a digital receiver has been described.

What is claimed is:

1. A method for performing timing recovery, frame synchronization and frequency offset correction in a receiver comprising:

sampling a received analog signal:

determining an average amplitude of a predetermined number of most recent samples;

determining a first correlation value that indicates when a synchronization sequence is received based on the average amplitude;

performing a frequency offset correction based on a second correlation value which is based on the average amplitude, wherein the first correlation value and the second correlation value are determined simultaneously; and sampling incoming data at a fixed offset from an end of the synchronization sequence.

2. The method of claim 1, wherein determining an average amplitude of a predetermined number of most recent samples further comprises:

summing the values of the predetermined number of most recent samples to generate an integrator output; and multiplying the integrator output by a scale factor.

3. The method of claim 1, wherein determining an average amplitude of a predetermined number of most recent samples further comprises:

subtracting an oldest sample value of the predetermined number of most recent samples from the average amplitude of the predetermined number of most recent samples; and adding a most recent sample value to the average amplitude of the predetermined number of most recent samples.

4. The method of claim 1, wherein determining a correlation value that indicates when a synchronization sequence is received further comprises:

determining a positive correlation value;

determining a negative correlation value;

subtracting the negative correlation value from the positive correlation value to determine the first correlation value; and determining synchronization when the correlation value surpasses a predetermined threshold correlation value.

5. The method of claim 4, wherein the positive correlation value is determined by:

$$p\_corr[k] = \frac{1}{16}\sum_{i=0}^{15} y[k - 16i - 8],$$

wherein i and k are indices over T/8-spaced samples.

6. The method of claim 4, wherein the negative correlation value is determined by:

$$n\_corr[k] = \frac{1}{16}\sum_{i=0}^{15} y[k - 16i],$$

wherein i and k are indices over T/8-spaced samples.

7. The method of claim 4, wherein the correlation value is determined by:

corr[k]=p_corr[k]−n_corr[k], wherein k is an index value, p_corr[k] is the positive correlation value, and n_corr[k] is the negative correlation value.

8. The method of claim 1, wherein performing frequency offset correction further comprises:
determining a frequency offset value in proportion to the average amplitude of the predetermined number of most recent samples when the synchronization sequence is received; and
adjusting the sampling in response to the frequency offset value.

9. The method of claim 1, wherein performing frequency offset correction further comprises:
determining a frequency offset value in proportion to the average amplitude of the predetermined number of most recent samples when the synchronization sequence is received; and
correcting the received signal in response to the frequency offset value.

10. The method of claim 1 further comprising determining a timing phase, wherein the timing phase trails the sampling of an analog signal by a predetermined period of time.

11. An apparatus for performing timing recovery, frame synchronization and frequency offset correction in a digital receiver, wherein the receiver samples a signal at a predetermined rate, the apparatus comprising:
means for sampling a received analog signal;
means for determining an average amplitude of a predetermined number of most recent samples;
means for determining a correlation value that indicates when a synchronization sequence is received;
means for performing frequency offset correction based on inputs used to determine the correlation value; and
means for sampling incoming data at a fixed offset from an end of the synchronization sequence.

12. The apparatus of claim 11, wherein the means for determining an average amplitude of a predetermined number of most recent samples further comprises:
means for summing the values of the predetermined number of most recent samples to generate an integrator output; and
means for multiplying the integrator output by a scale factor.

13. The apparatus of claim 11, wherein the means determining an average amplitude of a predetermined number of most recent samples further comprises:
means for subtracting an oldest sample value of the predetermined number of most recent samples from the average amplitude of the predetermined number of most recent samples; and
means for adding a most recent sample value to the average amplitude of the predetermined number of most recent samples.

14. The apparatus of claim 11, wherein the means for determining a correlation value that indicates when a synchronization sequence is received further comprises:
means for determining a positive correlation value;
means for determining a negative correlation value;
means for subtracting the negative correlation value from the positive correlation value to determine the correlation value; and
means for determining synchronization when the correlation value surpasses a predetermined threshold correlation value.

15. The apparatus of claim 14, wherein the positive correlation value is determined by:

$$p\_corr[k] = \frac{1}{16}\sum_{i=0}^{15} y[k - 16i - 8],$$

wherein i and k are indices over T/8-spaced samples.

16. The apparatus of claim 14, wherein the negative correlation value is determined by:

$$n\_corr[k] = \frac{1}{16}\sum_{i=0}^{15} y[k - 16i],$$

wherein i and k are indices over T/8-spaced samples.

17. The apparatus of claim 14, wherein the correlation value is determined by:

corr[k]=p_corr[k]−n_corr[k], wherein k is an index value, p_corr[k] is a positive correlation value, and n_corr[k] is the negative correlation value.

18. The apparatus of claim 11, wherein the means for performing frequency offset correction further comprises:
means for determining a frequency offset value in proportion to the average amplitude of the predetermined number of most recent samples when the synchronization sequence is received;
means for adjusting the sampling in response to the frequency offset value.

19. The apparatus of claim 11, wherein the means for performing frequency offset correction further comprises:
means for determining a frequency offset value in proportion to the average amplitude of the predetermined number of most recent samples when the synchronization sequence is received;
means for correcting the received signal in response to the frequency offset value.

20. The apparatus of claim 11 further comprising means for determining a timing phase, wherein the timing phase trails the sampling of an analog signal by a predetermined period of time.

21. A circuit for performing timing recovery, frame synchronization and frequency offset correction in a digital receiver, the circuit comprising:
a discriminator to sample a signal and to output a digital signal;

an integrator to receive the digital signal and to generate an average amplitude of a predetermined number of most recent samples;

a positive correlator coupled to the integrator, the positive correlator to generate a positive correlation value;

a negative correlator coupled to the integrator, the negative correlator to generate a negative correlation value;

a first summing circuit coupled to the positive correlator and to the negative correlator, the first summing circuit to subtract the negative correlation value from the positive correlation value;

a threshold detector coupled to the first summing circuit, the threshold detector to indicate frame synchronization when the output of the first summing circuit exceeds a predetermined value;

a second summing circuit coupled to the positive correlator and to the negative correlator, the second summing circuit to add the positive correlation value to the negative correlation value; and an AFC circuit coupled to the second summing circuit, the AFC circuit to generate a frequency correction value in response to an output generated by the second summing circuit, wherein the frequency correction value is generated simultaneously with the frame synchronization, and further wherein a frequency offset value is generated simultaneously with the frequency correction value.

22. The circuit of claim 21, wherein the positive correlation value is determined by:

$$p\_corr[k] = \frac{1}{16}\sum_{i=0}^{15} y[k-16i-8],$$

wherein i and k are indices over T/8-samples.

23. The circuit of claim 21, wherein the negative correlation value is determined by:

$$n\_corr[k] = \frac{1}{16}\sum_{i=0}^{15} y[k-16i],$$

wherein i and k are indices over T/8-samples.

* * * * *